United States Defensive Publication [19] (H) [11] T985,004

Paul, 3rd [43] Aug. 7, 1979

[54] SYNERGISTIC ULTRAVIOLET LIGHT STABILIZER MIXTURES FOR MONO-OLEFIN POLYMERS

[76] Inventor: Henry N. Paul, 3rd, 538 E. Gravers La., Philadelphia, Pa. 19118

[21] Appl. No.: 950,892

[22] Filed: Oct. 12, 1978

Related U.S. Application Data

[63] Continuation of Ser. No. 908,335, May 22, 1978, abandoned, which is a continuation of Ser. No. 849,907, Nov. 9, 1977, abandoned.

[51] Int. Cl.[2] ..... C08K 5/37

[52] U.S. Cl. ..... 260/45.7 S; 260/45.7 PH; 260/45.8 NT; 260/45.85 S; 260/45.95 F

[57] ABSTRACT

Polyolefins are stabilized against the degradative effects of ultraviolet light using mixtures of alkylene polysulfide polymers and conventional stabilizers such as hydroxy benzophenones, thiodipropionates and phenolic antioxidants.

3 Claims, No Sheets Drawing,

25 Pages Specification

The file of this unexamined application may be inspected and copies thereof may be purchased (849 O.G. 1221, Apr. 9, 1968).